Dec. 9, 1924.　　　　　　　　　　　　　　1,518,929
V. L. HOLT.
STUMP BURNER
Filed June 25, 1921
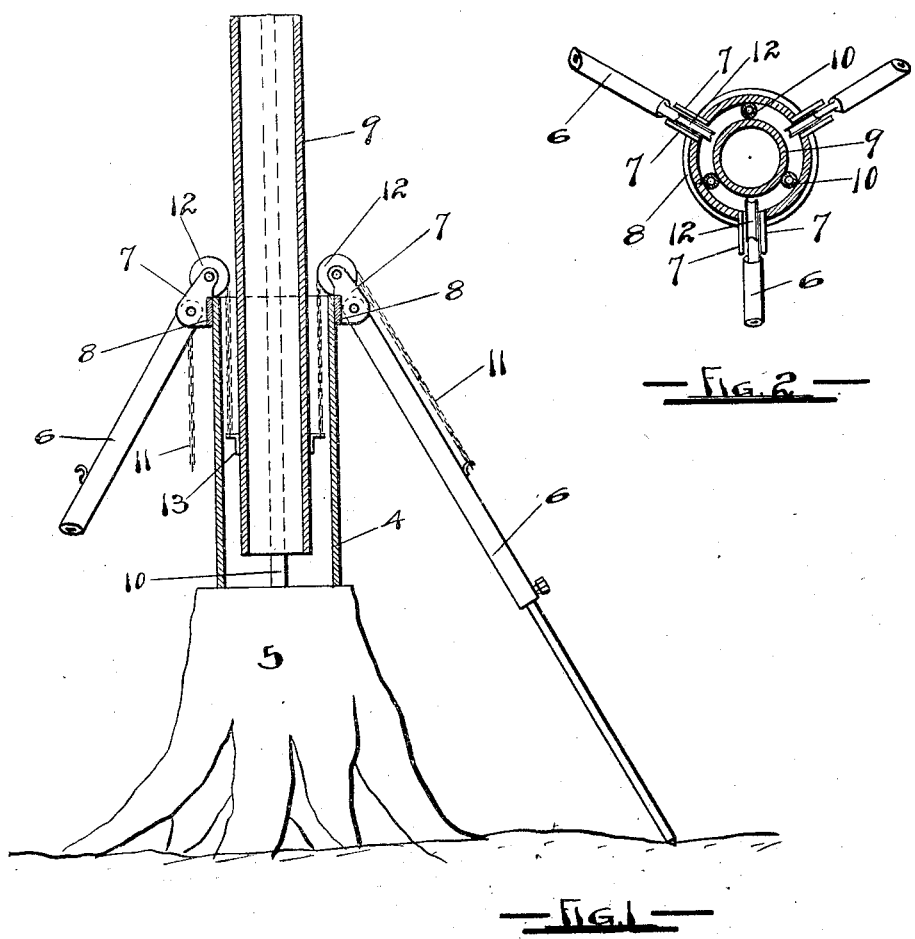
INVENTOR
VICTOR L. HOLT
BY
C. F. Blake
ATTORNEY Patented Dec. 9, 1924.

1,518,929

UNITED STATES PATENT OFFICE.

VICTOR L. HOLT, OF PORTLAND, OREGON.

STUMP BURNER.

Application filed June 25, 1921. Serial No. 480,409.

*To all whom it may concern:*

Be it known that I, VICTOR L. HOLT, a citizen of the United States, residing at Portland, county of Multnomah, State of Oregon, have invented certain Improvements in Stump Burners, of which the following is a specification.

My invention relates to devices for burning the stumps of trees left after logging and land clearing operations, the object of my invention being to provide a simple, cheap, and convenient device for burning the stump in place, and thus avoiding the necessity of pulling or blasting out the stump.

I accomplish the above object by means of the construction illustrated in the accompanying drawing, which is a part of this application for Letters Patent, like characters of reference indicating like parts throughout the several views thereof, and in which:

Fig. 1 is a longitudinal sectional elevation of my device, and Fig. 2 is a sectional plan view thereof.

In the preferred form illustrated in Fig. 1 I provide a pipe 4 adapted to rest upon the top of the stump 5, the upper end of said pipe 4 being steadied by means of telescopic tripod legs 6. Said tripod legs are conveniently pivoted to brackets 7 secured to a ring or collar 8 upon the upper end of the pipe 4.

A pipe 9 is also provided, and is telescopically disposed within the pipe 4, a space being left therebetween. To guide said pipe 9 longitudinally within pipe 4 and to preserve the space therebetween constant I attach to the pipe 9 a plurality (preferably three) small pipes or tubes 10. Said tubes 10 are secured to the pipe 9 longitudinally thereof upon the outer surface, and they are of such outside diameter as to just fill the space between the pipe 9 and the pipe 4, as shown in Fig. 2.

The tubes 10 project a short distance below the lower end of the pipe 9 and thus form suitable feet to rest upon the top of the stump and prevent contact of the pipe 9 with the stump, as shown in Fig. 1.

The device is assembled upon the top of the stump 5 as shown in Fig. 1, and a fire is lighted upon the stump top immediately below the pipe 9. The heated air ascending through the pipe 9 will cause a draft of cold air to descend through the space between the pipes 9 and 4, thus causing a constant draft that will feed the fire and cause the stump to burn completely away. The pipe 9 follows the burning stump downwards as the top of the latter burns off, and the pipe 4 is lowered from time to time as necessitated by manipulation of the tripod legs, or the pipe 4 may be constructed to slide within the collar 8 and thus follow the burning stump downwards if desired.

The tubes 10 provide means whereby additional fuel for the fire may be utilized if desired, as by pouring oil through them, and they may be filled with suitable heat resisting wicking, such as asbestos or the like, which wicking may be saturated with oil which will thus be fed to the fire slowly.

In order to control the intensity of the fire it may become necessary at times to regulate the draft, and to accomplish this I provide flexible members such as chains 11 passed over sheaves 12 mounted upon the brackets 7, said chains being secured to the pipe 9 by clips 13, as shown in Fig. 1. Said chains ordinarily hang loose as shown, but when it is desired to check the fire said chains are pulled down and hooked upon the adjacent tripod legs as shown at 11 in Fig. 1. Thus the pipe 9 may be raised any desired distance from the stump top and suspended in such raised position, thus checking the draft and so the fire.

My device may be made of any size and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claim.

Having disclosed my invention so that others may be enabled to construct and use the same, what I claim as new, and desire to secure by Letters Patent is:

In a stump burner: coaxial telescopic pipes spaced apart; a plurality of tubes within the space between said pipes and secured to the inner of said pipes, and projecting beyond the lower end of the inner pipe to form feet therefor; a tripod for supporting the outer of said pipes upon the top of the stump; and flexible connections between the inner of said pipes and said tripod for the purpose of adjusting the position of said inner pipe.

In witness whereof I claim the foregoing as my own I hereunto affix my signature in the presence of two witnesses at Portland, county of Multnomah, State of Oregon, this 18th day of June, 1921.

VICTOR L. HOLT.

Witnesses:
L. J. ROBINSON,
C. F. BLAKE.